(12) United States Patent
Liang et al.

(10) Patent No.: US 12,025,865 B2
(45) Date of Patent: Jul. 2, 2024

(54) DISTRIBUTED OPTICAL PHASE MODULATOR

(71) Applicant: SUZHOU LYCORE TECHNOLOGIES CO., LTD., Suzhou (CN)

(72) Inventors: Hanxiao Liang, Suzhou (CN); Yipin Song, Suzhou (CN)

(73) Assignee: SUZHOU LYCORE TECHNOLOGIES CO., LTD., Suzhou (CN)

( * ) Notice: Subject to any disclaimer, the term of this patent is extended or adjusted under 35 U.S.C. 154(b) by 262 days.

(21) Appl. No.: 17/639,345

(22) PCT Filed: Mar. 30, 2020

(86) PCT No.: PCT/CN2020/081992
§ 371 (c)(1),
(2) Date: Mar. 1, 2022

(87) PCT Pub. No.: WO2021/103367
PCT Pub. Date: Jun. 3, 2021

(65) Prior Publication Data
US 2022/0291534 A1 Sep. 15, 2022

(30) Foreign Application Priority Data

Nov. 29, 2019 (CN) .......................... 201911210182.4
Nov. 29, 2019 (CN) .......................... 201922115541.X

(51) Int. Cl.
*G02F 1/035* (2006.01)
*G02F 1/03* (2006.01)

(52) U.S. Cl.
CPC .......... *G02F 1/0356* (2013.01); *G02F 1/0327* (2013.01); *G02F 2201/12* (2013.01); *G02F 2201/127* (2013.01)

(58) Field of Classification Search
CPC .. G02F 1/0327; G02F 1/0356; G02F 2201/12; G02F 2201/127
See application file for complete search history.

(56) References Cited

U.S. PATENT DOCUMENTS

| 5,157,744 | A | 10/1992 | Korotky |
| 8,346,025 | B2 * | 1/2013 | Gill ....................... G02F 1/2257 438/31 |

(Continued)

FOREIGN PATENT DOCUMENTS

| CN | 102648434 A | 8/2012 |
| CN | 103597386 A | 2/2014 |

(Continued)

OTHER PUBLICATIONS

International Search Report, issued in PCT/CN2020/081992, dated Sep. 4, 2020.

(Continued)

*Primary Examiner* — Daniel Petkovsek

(57) ABSTRACT

Provided is a distributed optical phase modulator, comprising: a substrate (10); an optical waveguide (20) arranged on the substrate (10); a drive electrode (30) that is arranged on the substrate (10) and comprises a plurality of sub drive electrodes (31) arranged at intervals; and at least one shielding electrode (40), wherein at least some shielding electrodes and the sub drive electrodes (31) are arranged at intervals. The optical waveguide (20) sequentially passes through the sub drive electrodes (31) and the shielding electrodes (40). The length of each part of the drive electrode (30) is far less than the total length of an equivalent traditional modulator, and the drive signal voltage of each part is also far less than the drive signal voltage of the equivalent traditional modulator. In each part of the drive electrode (30), the propagation of an optical signal and the propagation of an electrical signal can be approximately (Continued)

synchronous, even synchronous. The phenomenon of walk-off between the optical signal and the electrical signal is minimized, and the upper limit of a modulation bandwidth is improved. The shielding electrodes (40) are respectively arranged between the sub drive electrodes (31), so that crosstalk between the sub drive electrodes (31) can be shielded, and crosstalk between the sub drive electrodes (31) can be greatly reduced.

14 Claims, 2 Drawing Sheets

(56) References Cited

U.S. PATENT DOCUMENTS

| | | | |
|---|---|---|---|
| 11,307,484 B2* | 4/2022 | Zhang | G02F 2/02 |
| 2001/0004295 A1 | 6/2001 | Doi et al. | |
| 2012/0251029 A1* | 10/2012 | Kobrinsky | G02F 1/035 |
| | | | 385/2 |
| 2019/0025615 A1* | 1/2019 | Kawamura | G02F 1/025 |
| 2021/0080796 A1* | 3/2021 | Kissa | G02F 1/0356 |

FOREIGN PATENT DOCUMENTS

| | | |
|---|---|---|
| CN | 107533248 A | 1/2018 |
| CN | 110441928 A | 11/2019 |
| CN | 110737115 A | 1/2020 |
| JP | 405019220 A | 1/1993 |
| JP | 2016194544 A | 11/2016 |

OTHER PUBLICATIONS

Written Opinion, issued in PCT/CN2020/081992, dated Sep. 4, 2020.

* cited by examiner

DISTRIBUTED OPTICAL PHASE MODULATOR

TECHNICAL FIELD

This application relates to the technical field of light modulation, and specifically, to a distributed optical phase modulator.

BACKGROUND

High-speed electro-optical modulation is wide and important in application, such as optical communication, microwave photoelectrons, laser-beam deflection, and wavefront modulation. The electro-optic modulator is a modulator made by an electro-optic effect of some electro-optic crystals, such as a lithium niobate (LiNbO3) crystal, a gallium arsenide (GaAs) crystal and a lithium tantalate (LiTaO3) crystal. The electro-optic effect means that, when a voltage is applied to the electro-optic crystal, the refractive index of the electro-optic crystal will be changed, resulting in a change in the characteristics of the light wave passing through the crystal, so as to realize the modulation of the phase, amplitude, intensity and polarization state of the optical signal.

However, during the modulation of the light, it is hard to realize the modulation of low drive voltage and high modulation bandwidth simultaneously.

SUMMARY

This application is mainly intended to provide a distributed optical phase modulator, to realize the modulation of low drive voltage and high modulation bandwidth.

Based on this, embodiments of this application provide a distributed optical phase modulator. The distributed optical phase modulator includes: a substrate; an optical waveguide, arranged on the substrate; a drive electrode, arranged on the substrate and including a plurality of sub drive electrodes arranged at intervals; and at least one shielding electrode, at least some of which are spaced apart from the sub drive electrodes. The optical waveguide sequentially passes through the sub drive electrodes and the shielding electrodes.

Optionally, the drive electrode is a coplanar waveguide structure.

Optionally, a same electrical signal is applied to the sub drive electrodes.

Optionally, the electrical signal applied to the adjacent sub drive electrodes has a time delay. A duration of time delay is a duration required for an optical signal to be transmitted from an initial terminal of the previous sub drive electrode to an initial terminal of the adjacent next sub drive electrode.

Optionally, the optical waveguide includes a plurality of modulation portions and a plurality of bending portions connected between the modulation portions. Each of the bending portions is bent toward the previous modulation portion connected to the bending portion.

Optionally, each of the modulation portions includes a first sub-modulation portion and a second sub-modulation portion. Light propagation directions in the first sub-modulation portion and the second sub-modulation portion are opposite.

Optionally, the first sub-modulation portion is parallel to the second sub-modulation portion. The optical signal propagation directions in the first sub-modulation portion and the second sub-modulation portion are opposite.

Optionally, the first sub-modulation portion passes through the sub drive electrode and/or the shielding electrode. The second sub-modulation portion passes through the shielding electrode and/or the sub drive electrode.

Optionally, the sub drive electrode includes: a drive signal electrode, located on one side of the optical waveguide, a drive signal being applied thereon; and a grounding electrode, located on the other side of the optical waveguide.

Optionally, the shielding electrode includes: a first grounding wire, located on one side of the optical waveguide; and a second grounding wire, located on the other side of the optical waveguide.

This application has the following beneficial effects.

The drive electrode is designed as a distributed drive electrode. Since the drive electrode is in a distributed type, a length of the drive electrode of each section is far less than a total length of an equivalent traditional modulator. In addition, a drive signal voltage of each section is also far less than a drive signal voltage of the equivalent traditional modulator. In the drive electrode of each section, the optical signal and the electrical signal can be synchronously propagated approximately, or even synchronously propagated. The phenomenon of walk-off between the optical signal and the electrical signal is minimized, and the upper limit of a modulation bandwidth is improved. In addition, since the drive electrode is changed to the distributed multi-section drive electrode from a traditional one-section drive electrode, the drive voltage required to be applied to each electrode is greatly reduced. By respectively disposing the shielding electrodes between the sub drive electrodes, crosstalk between the sub drive electrodes can be shielded, so that the crosstalk between the sub drive electrodes can be greatly reduced.

The electrical signal applied to each sub drive electrode is the same. Since the same electrical signal is applied to the drive electrode of each section, it is equivalent to that the electrical signal is reset when the electrical signal is propagated along the drive electrode of each section. Therefore, the loss of the electrical signal is greatly reduced, and modulation efficiency is greatly enhanced.

BRIEF DESCRIPTION OF THE DRAWINGS

The accompanying drawings described herein are used to provide a further understanding of this application, constitute a part of this application, so that other features, objectives and advantages of this application become more obvious. The exemplary embodiments of this application and the description thereof are used to explain this application, but do not constitute improper limitations to this application. In the drawings.

DETAILED DESCRIPTION OF THE EMBODIMENTS

In order to enable those skilled in the art to better understand the solutions of this application, the technical solutions in the embodiments of this application will be clearly and completely described below in combination with the drawings in the embodiments of this application. It is apparent that the described embodiments are only part of the embodiments of this application, not all the embodiments. All other embodiments obtained by those of ordinary skill in the art on the basis of the embodiments in this application without creative work shall fall within the scope of protection of this application. In addition, terms "include" and "have" and any variations thereof are intended to cover non-exclusive inclusions.

It is to be noted that the embodiments in this application and the features in the embodiments may be combined with one another without conflict. This application will now be described below in detail with reference to the drawings and the embodiments.

As described in the Background, there is often a trade-off between a drive voltage and a modulation bandwidth. The electro-optic effect is usually weak in an electro-optic medium, so that a low modulation voltage requires long enough waveguides to accumulate enough electro-optic effects. However, through research, the inventor has discovered that, there is a group velocity mismatch between the light wave and the drive electrical signal, and long-distance transmission may cause a serious light wave-drive electrical signal walk-off phenomenon between light wave and drive electrical signal, which severely limits the modulation bandwidth. In addition, long optical waveguides also require long drive electrodes. Due to the resistance loss of an electrode material, a large microwave drive signal propagation loss is caused, resulting in limitation on the possibility of further reducing the drive voltage. In addition, as the modulation bandwidth increases, the crosstalk between a plurality of signals becomes more and more significant. In the end, the reduction of the drive voltage is hard to continue. Such a serious design trade-off problem exists in almost all electro-optic modulators based on traveling waves, which severely limits the performance of devices.

Figure 1:
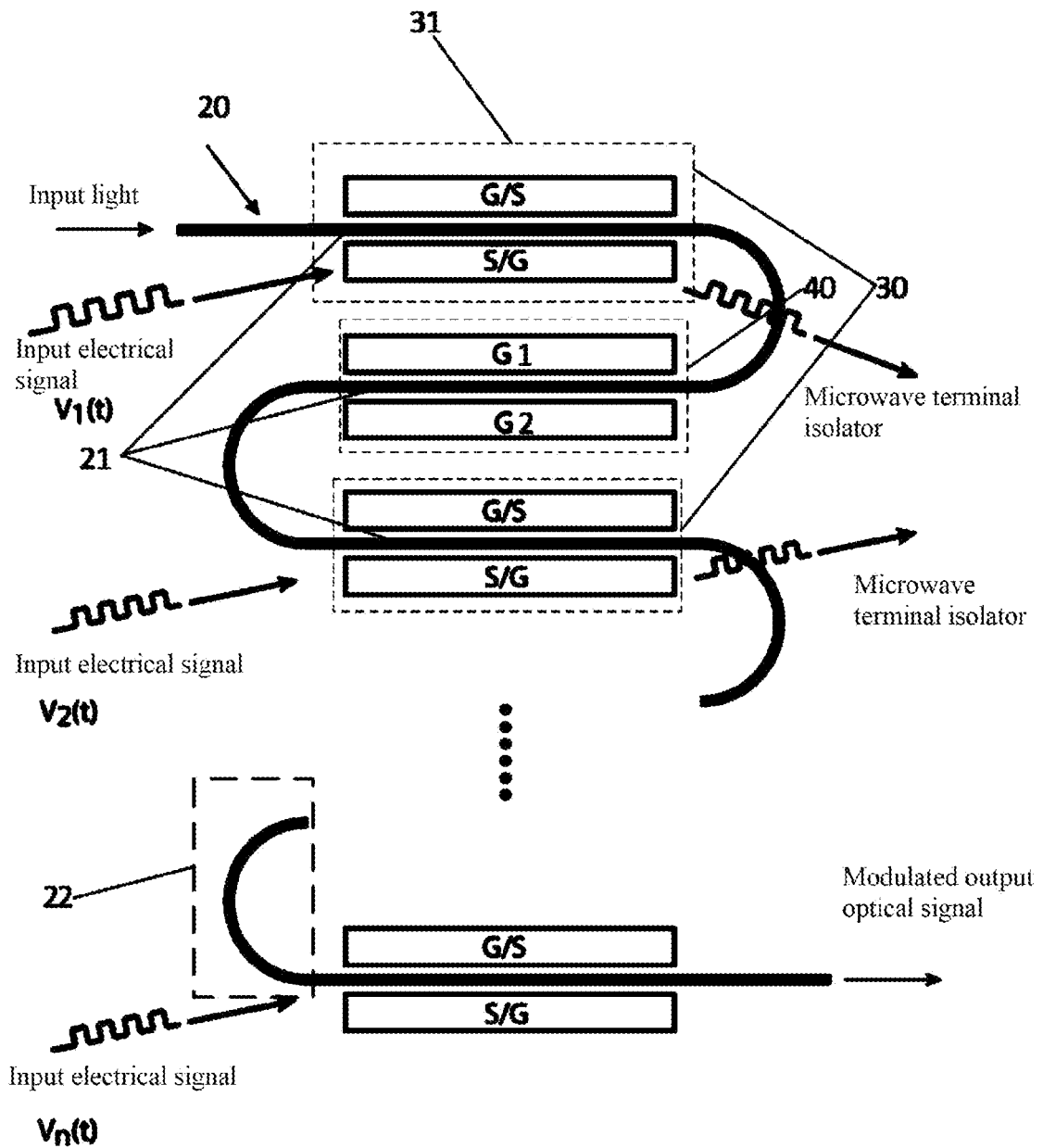
FIG. 1 is a schematic diagram of a distributed optical phase modulator according to an embodiment of this application.

Based on the research discovery of the inventor, the embodiments of the disclosure provide a distributed optical phase modulator. As shown in FIG. 1, the distributed optical phase modulator includes: a substrate 10; an optical waveguide 20, arranged on the substrate 10; a drive electrode 30, arranged on the substrate 10 and including a plurality of sub drive electrodes 31 arranged at intervals; and at least one shielding electrode 40, at least some of which are spaced apart from the sub drive electrodes 31. In this embodiment, the shielding electrodes 40 and the sub drive electrodes 31 may be arranged at intervals in order, or may not be arranged at intervals in order. For example, one sub drive electrode 31 may be disposed every two or more than two shielding electrodes 40. The optical waveguide 20 sequentially passes through the sub drive electrodes 31 and the shielding electrodes 40. Due to a group velocity mismatch between the light wave and the drive electrical signal, long-distance transmission may cause a serious walk-off phenomenon between light wave and drive electrical signal, which severely limits the reduction of the drive voltage and the increasing of the modulation bandwidth. Therefore, in this embodiment, the drive electrode 30 is designed as the distributed drive electrode. Since the drive electrode 30 is in the distributed type, a length of the drive electrode 30 of each section is far less than a total length of a modulator. In the drive electrode 30 of each section, an optical signal and an electrical signal can be synchronously propagated approximately, or even synchronously propagated. The phenomenon of walk-off between the optical signal and the electrical signal is minimized, and the upper limit of a high modulation bandwidth is increased. With the increasing of the bandwidth, the crosstalk between a plurality of signals becomes more and more significant. A plurality of shielding electrodes 40 are respectively arranged between the plurality of sub drive electrodes 31 to shield crosstalk between the sub drive electrodes 31 can be shielded, so that the crosstalk between the sub drive electrodes can be greatly reduced. The drive voltage is further reduced while the bandwidth is increased.

Figure 2:
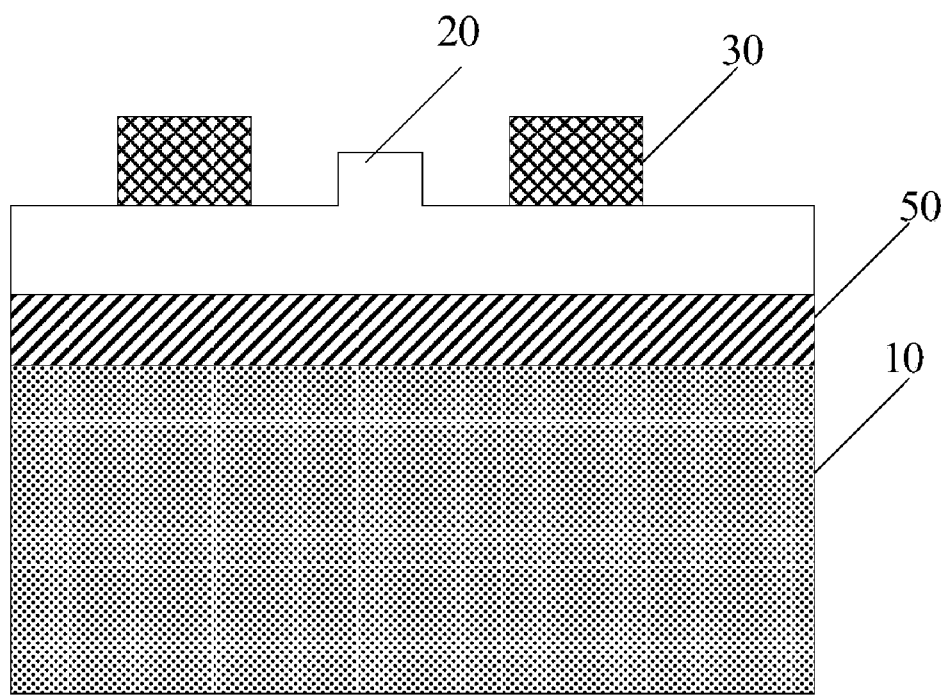
FIG. 2 is a partial schematic cross-sectional view of a distributed optical phase modulator according to an embodiment of this application.

As an exemplary embodiment, a light modulator may be a lithium niobate (LiNbO3) crystal light modulator, a gallium arsenide (GaAs) crystal light modulator or a lithium tantalate (LiTaO3) crystal light modulator. In this embodiment, the lithium niobate crystal light modulator is used as an example for description. FIG. 2 is a partial cross-sectional view of the light modulator. The optical waveguide 20 and the drive electrode 30 are located on a surface of the substrate 10. Bonding layers 50 are respectively disposed between the substrate 10 and the optical waveguide 20, and between the substrate and the drive electrode 30.

As an exemplary embodiment, the drive electrode 30 includes a signal electrode S to which an electrical signal is applied and a grounding electrode G. The optical waveguide is located between the signal electrode S and the grounding electrode G. In this embodiment, the signal electrode S and the grounding electrode G of the drive electrode may be disposed parallel to the optical waveguide. In this embodiment, the optical waveguide is made of an electro-optic material, the refractive index of the optical waveguide varies with an external voltage, and a phase of input light passing through the optical waveguide varies with a voltage applied to the optical waveguide. By applying the electrical signal on the drive electrode, a phase of the optical signal in the optical waveguide is changed to realize optical phase modulation.

As an exemplary embodiment, the drive electrode 30 includes N sub drive electrodes 31 spaced apart from each other along the optical waveguide 20, where N≥2. As shown in FIG. 1. The drive electrode 30 is divided into N sections, each section merely has a short length L, and a final effective drive length is N*L. In this embodiment, the electrical signal applied to each sub drive electrode 31 is the same. Since the same electrical signal is applied to the sub drive electrode 31 of each section, it is equivalent to that the electrical signal is reset when the electrical signal is propagated along the drive electrode 31 of each section. Therefore, the loss of the electrical signal is greatly reduced, and modulation efficiency is greatly enhanced.

In order to better match the electrical signal on each sub drive electrode 31 to cause the modulation of the optical signal on each sub drive electrode 31 as the same as possible, in this embodiment, the electrical signal applied to the adjacent sub drive electrodes 31 has a delay. A duration of time delay is a duration required for an optical signal to be transmitted from an end of the previous sub drive electrode 31 to an initial terminal of the adjacent next sub drive electrode 31. As an exemplary embodiment, assuming that the electrical signal applied to the first sub drive electrode 31 is $V_1(t)$, the time of the optical signal to be transmitted from the end of the nth sub drive electrode 31 to the initial terminal of the n+1th sub drive electrode 31 is Tn, where n=1, 2, . . . , N−1 represents which sub drive electrode 31 it is. An expression of the electrical signal applied to each sub drive electrode 31 is shown as follows:

$$V_n(t) = V_1\left(t - \sum_{j=1}^{n-1} T_j\right)$$

Due to the electrical signal applied on the adjacent sub drive electrodes 31 and the time delay in propagation of the optical signal before the distributed drive electrode 30, the sub drive electrode 31 of each section has the same electrical signal. It is equivalent to that the electrical signal is reset when the electrical signal is propagated along the drive electrode 31 of each section. Therefore, the loss of the electrical signal is greatly reduced, and modulation efficiency is greatly enhanced.

In this embodiment, the drive electrode 30 is a coplanar waveguide structure. Exemplarily, the drive electrode may be a GS coplanar waveguide line, (the coplanar waveguide structure may further use other phase modulation units). An unmodulated constant-bright light source is input to sequentially pass through regions of the N sub drive electrodes 31. Left ends of the sub drive electrodes 31 are input regions of the electrical signal, and right ends of the sub drive electrodes are coupled to an external microwave terminal isolator (RF terminator) or a microwave terminal isolator circuit (on-chip circuit). The input optical signal is output after passing through the plurality of sub drive electrodes 31. As an exemplary embodiment, the impedance of the sub drive electrode 31 is the same or similar to the impedance of an electrical signal inputting terminal, for example, may be 50Ω. A propagation velocity of the electrical signal in the drive electrode 30 is the same or similar to a velocity of light in the optical waveguide 20. The resistance loss of the electrical signal transmitted in the drive electrode 30 is as low as possible. In this embodiment, the drive electrode 30 may be made of a high-conductivity and low-resistance material, such as gold, silver and graphene.

As an exemplary embodiment, as shown in FIG. 1, the optical waveguide includes a plurality of modulation portions 21 and a plurality of bending portions 22 connected between the modulation portions 21. Each of the bending portions 22 is bent toward the previous modulation portion 21 connected to the bending portion 22. Exemplarily, from the first modulation portion 21 of the optical waveguide, the first bending portion 22 connected to the first modulation portion 21 is bent toward the first modulation portion 21, so that the second modulation portion 21 connected to the first bending portion 22 extends toward the first modulation portion 21. Therefore, after the plurality of modulation portions 21 are connected to the plurality of bending portions 22, a formed shape is roughly an "S" shape or a "snake shape" extending back and forth. As an exemplary embodiment, each of the modulation portions 21 includes a first sub-modulation portion and a second sub-modulation portion. A light propagation direction in the first sub-modulation portion is differ from a light propagation direction in the second sub-modulation portion. Exemplarily, an extending direction of the first sub-modulation portion may be a "forward" direction of the optical waveguide, and an extending direction of the second sub-modulation portion may be a "backward" direction of the optical waveguide.

As an exemplary embodiment, the first sub-modulation portion passes through one of the sub drive electrodes, and the second sub-modulation portion passes through one of the shielding electrodes. Those of skill in the art should understand that, the first sub-modulation portion may also pass through the shielding electrode 40, and the second sub-modulation portion may also pass through the sub drive electrode 31. In this embodiment, arrangement positions of the shielding electrodes 40 and the sub drive electrodes 31 are not limited. Exemplarily, as shown in FIG. 1, in a Y direction of a surface of the substrate, the first sub-modulation portion and the second sub-modulation portion are arranged at intervals, and the sub drive electrode and the shielding electrode are arranged at intervals. The signal electrode is located on one side of the first sub-modulation portion, and the grounding electrode is located on the other side of the first sub-modulation portion. In addition, a first grounding wire G1 of the shielding electrode is located on one side of the second sub-modulation portion, and a second grounding wire G2 of the shielding electrode is located on the other side of the second sub-modulation portion. Since crosstalk exists between the sub drive electrodes while low drive voltage and high modulation bandwidth are synchronized, the shielding electrodes are spaced between the sub drive electrodes in the Y direction of the surface of the substrate. In this way, while synchronously reducing the drive voltage and increasing the modulation bandwidth, the modulator can reduce the crosstalk between the sub drive electrodes, and further reduce the drive voltage. Therefore, the modulation performance of the light modulator can be greatly improved.

The above are only the preferred embodiments of this application and are not intended to limit this application. For those skilled in the art, this application may have various modifications and variations. Any modifications, equivalent replacements, improvements and the like made within the spirit and principle of this application shall fall within the scope of protection of this application.

What is claimed is:

1. A distributed optical phase modulator, comprising
a substrate; an optical waveguide disposed on the substrate;
a drive electrode, disposed on the substrate and comprising a plurality of sub drive electrodes arranged at intervals;
at least one shielding electrode, at least a portion of which are spaced apart from the sub drive electrodes, wherein
the optical waveguide sequentially passes through the sub drive electrodes and the at least one shielding electrode,
the optical waveguide comprises a plurality of modulation portions,
each of the modulation portions comprises a first sub-modulation portion and a second sub-modulation portion,
a first grounding wire of the at least one shielding electrode is located on one side of the second sub-modulation portion, and a second grounding wire of the at least one shielding electrode is located on the other side of the second sub-modulation portion,
the at least one shielding electrode are spaced between the sub drive electrodes in a Y direction of a surface of the substrate,
a plurality of shielding electrodes are respectively arranged between the plurality of sub drive electrodes.

2. The distributed optical phase modulator as claimed in claim 1, wherein the drive electrode is a coplanar waveguide structure.

3. The distributed optical phase modulator as claimed in claim 2, wherein a same electrical signal is applied to the sub drive electrodes.

4. The distributed optical phase modulator as claimed in claim 3, wherein
the electrical signal applied to the adjacent sub drive electrodes has a time delay, wherein a duration of time delay is a duration required for an optical signal to be transmitted from an initial terminal of one of the adjacent sub drive electrodes to an initial terminal of another one of the adjacent sub drive electrodes.

5. The distributed optical phase modulator as claimed in claim 4, wherein
the optical waveguide comprises a plurality of bending portions connected between the modulation portions, wherein each of the bending portions is bent toward the previous modulation portion connected to the bending portion.

6. The distributed optical phase modulator as claimed in claim 5 wherein
wherein light propagation directions in the first sub-modulation portion and the second sub-modulation portion are opposite.

7. The distributed optical phase modulator as claimed in claim 6, wherein
the first sub-modulation portion is parallel to the second sub-modulation portion, and the optical signal propagation directions in the first sub-modulation portion and the second sub-modulation portion are opposite.

8. The distributed optical phase modulator as claimed in claim 7, wherein
the first sub-modulation portion passes through the sub drive electrode and/or the shielding electrode; and
the second sub-modulation portion passes through the shielding electrode and/or the sub drive electrode.

9. The distributed optical phase modulator as claimed in claim 6, wherein
the first sub-modulation portion passes through a sub drive electrode of the plurality of sub drive electrodes and/or the at least one shielding electrode; and
the second sub-modulation portion passes through the shielding electrode and/or the sub drive electrode.

10. The distributed optical phase modulator as claimed in claim 3, wherein
the optical waveguide comprises a plurality of modulation portions and a plurality of bending portions connected between the modulation portions, wherein each of the bending portions is bent toward the previous modulation portion connected to the bending portion.

11. The distributed optical phase modulator as claimed in claim 2, wherein
the optical waveguide comprises a plurality of modulation portions and a plurality of bending portions connected between the modulation portions, wherein each of the bending portions is bent toward the previous modulation portion connected to the bending portion.

12. The distributed optical phase modulator as claimed in claim 1, wherein a sub drive electrode of the plurality of sub drive electrodes comprises:
a drive signal electrode, located on one side of the optical waveguide, a drive signal being applied thereon; and
a grounding electrode, located on the other side of the optical waveguide.

13. The distributed optical phase modulator as claimed in claim 1, wherein the at least one shielding electrode comprises:
a first grounding wire, located on one side of the optical waveguide; and
a second grounding wire, located on the other side of the optical waveguide.

14. The distributed optical phase modulator as claimed in claim 1, wherein
the optical waveguide comprises a plurality of modulation portions and a plurality of bending portions connected between the modulation portions, wherein each of the bending portions is bent toward the previous modulation portion connected to the bending portion.

* * * * *